US012650873B2

(12) United States Patent
Sui et al.

(10) Patent No.: US 12,650,873 B2
(45) Date of Patent: Jun. 9, 2026

(54) DATA TRANSMISSION ENHANCEMENT FOR HYBRID CLOUD

(71) Applicant: International Business Machines Corporation, Armonk, NY (US)

(72) Inventors: Guang Han Sui, Beijing (CN); Peng Hui Jiang, Beijing (CN); Fan Jing Meng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 18/212,147

(22) Filed: Jun. 20, 2023

(65) Prior Publication Data

US 2024/0427617 A1     Dec. 26, 2024

(51) Int. Cl.
*G06F 9/455*          (2018.01)

(52) U.S. Cl.
CPC .. *G06F 9/45558* (2013.01); *G06F 2009/4557* (2013.01)

(58) Field of Classification Search
CPC ..................... G06F 9/45558; G06F 2009/4557
See application file for complete search history.

(56) References Cited

U.S. PATENT DOCUMENTS

| | | | |
|---|---|---|---|
| 7,962,642 B2 | 6/2011 | Ignatius | |
| 9,836,244 B2 | 12/2017 | Bates | |
| 10,373,101 B2 | 8/2019 | Deshpande | |
| 2010/0199042 A1* | 8/2010 | Bates ................... | H04L 9/0625 |
| | | | 711/135 |

| | | | |
|---|---|---|---|
| 2013/0110778 A1* | 5/2013 | Taylor ................. | G06F 11/1435 |
| | | | 707/624 |
| 2013/0246711 A1* | 9/2013 | Testardi ............... | G06F 12/122 |
| | | | 711/135 |
| 2015/0046600 A1* | 2/2015 | Kim .................... | H04L 67/1095 |
| | | | 709/232 |
| 2016/0337473 A1* | 11/2016 | Rao ..................... | H04L 12/4633 |
| 2017/0206217 A1* | 7/2017 | Deshpande ............ | G06N 5/045 |
| 2017/0351434 A1* | 12/2017 | Nakajima ............... | G06F 3/067 |

(Continued)

FOREIGN PATENT DOCUMENTS

CN          111629028 B     2/2022

OTHER PUBLICATIONS

Rahman et al, "Hybrid Heuristic for Scheduling Data Analytics Workflow Applications in Hybrid Cloud Environment", 2011 IEEE International Parallel & Distributed Processing Symposium, 9 pps., <https://ieeexplore.ieee.org/abstract document/6008944>.

(Continued)

*Primary Examiner* — Anthony Mejia
*Assistant Examiner* — Hassan Abdur-Rahman Khan
(74) *Attorney, Agent, or Firm* — Scott Dobson

(57) ABSTRACT

The method provides for enhancing transmission of data between multiple host arrays in separate cloud environments. Arrays of host devices are built, respectively, within a plurality of cloud environments. Data transmission from the data source is received by a first array of host devices of a first cloud environment, and the first array of host devices of the first cloud environment transmits the received data to a second array of host devices of a second cloud environment, and the first array of host devices and the second array of host devices transmit the data to a third array of host devices of a third cloud environment.

19 Claims, 3 Drawing Sheets

(56)      References Cited

U.S. PATENT DOCUMENTS

| | | | |
|---|---|---|---|
| 2020/0192578 A1* | 6/2020 | Sinha | G06F 3/0653 |
| 2020/0322416 A1* | 10/2020 | Sui | H04L 67/06 |
| 2022/0334925 A1* | 10/2022 | Rakesh | G06F 11/1451 |
| 2023/0006878 A1* | 1/2023 | Sui | H04L 41/0668 |
| 2023/0359644 A1* | 11/2023 | Miller | G06F 3/0608 |
| 2024/0012714 A1* | 1/2024 | Borowiec | G06F 11/2094 |
| 2024/0248802 A1* | 7/2024 | Yadav | G06F 11/1469 |
| 2024/0256405 A1* | 8/2024 | Shetty | G06F 11/2023 |

OTHER PUBLICATIONS

Yildirim et al., "Application-Level Optimization of Big Data Transfers Through Pipelining, Parallelism and Concurrency", IEEE Transactions on Cloud Computing, 2168-7161 (c) 2015 IEEE, , <https://ieeexplore.ieee.org/abstract/document/7065237>.

* cited by examiner

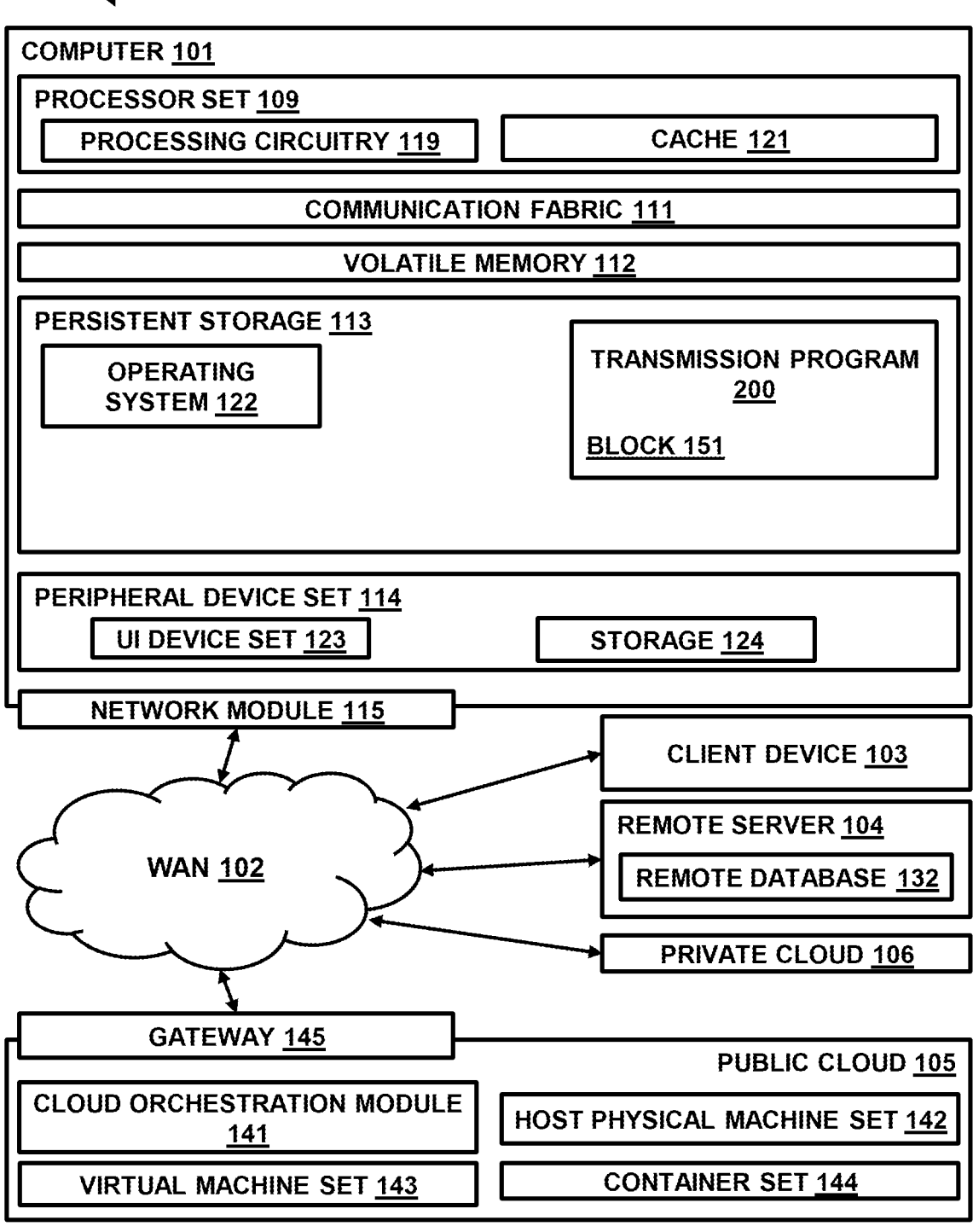

100

COMPUTER 101

PROCESSOR SET 109

PROCESSING CIRCUITRY 119      CACHE 121

COMMUNICATION FABRIC 111

VOLATILE MEMORY 112

PERSISTENT STORAGE 113

OPERATING SYSTEM 122

TRANSMISSION PROGRAM 200

BLOCK 151

PERIPHERAL DEVICE SET 114

UI DEVICE SET 123      STORAGE 124

NETWORK MODULE 115

WAN 102

CLIENT DEVICE 103

REMOTE SERVER 104

REMOTE DATABASE 132

PRIVATE CLOUD 106

GATEWAY 145

PUBLIC CLOUD 105

CLOUD ORCHESTRATION MODULE 141

HOST PHYSICAL MACHINE SET 142

VIRTUAL MACHINE SET 143

CONTAINER SET 144

FIG. 3

DATA TRANSMISSION ENHANCEMENT FOR HYBRID CLOUD

BACKGROUND

The present invention relates to data transfer, and more specifically improving data transfer between cloud environments of a hybrid cloud solution by utilizing network bandwidths between cloud environments.

Pipeline transmission is an effective solution to transmit data among computer hosts within a cloud environment. Typically, a client computing device, connected to a data source, sends data to a first host of an array of host devices. The first host receives the data, saves a copy, and transmits the data to a second host, and so on to all the host devices of the array. The data may be received, saved, and re-transmitted byte-by-byte or, alternatively, block-by-block. The result is that all hosts of the array receive the data promptly, with the last host of the array sending a notification of transmission complete to the client. Pipeline transmission provides a faster and more efficient means of data transfer than transmitting data from the data source to each host recipient in the cloud environment.

A hybrid cloud solution often includes multiple cloud environments with respective cloud environments having different network bandwidths to a data source. Additionally, network bandwidth between cloud environments of the hybrid cloud solution may also differ. Data transmission from a data source to hosts in multiple cloud environments is complex and may experience different transmission rates due to different network bandwidths.

SUMMARY

According to an embodiment of the present invention, a computer-implemented method, computer program product, and computer system are provided for enhancing data transmission to multiple host devices in separate cloud environments. The method provides for a processor to build an array of host devices operating within a respective cloud environment of a plurality of cloud environments. The processor transmits data to a first array of host devices within a first cloud environment in which a client device initiates data transmission. The processor transmits data from the first array of host devices of the first cloud environment to a second array of host devices in a second cloud environment, and the processor transmits data from both the first array of host devices of the first cloud environment and the second array of host devices of the second cloud environment to a third array of hosts in a third cloud environment.

BRIEF DESCRIPTION OF THE DRAWINGS

FIG. 3 depicts a block diagram of components of a computing system, including a computing device configured to operationally perform the transmission program of FIG. 2, in accordance with an embodiment of the present invention.

DETAILED DESCRIPTION

Figure 1:
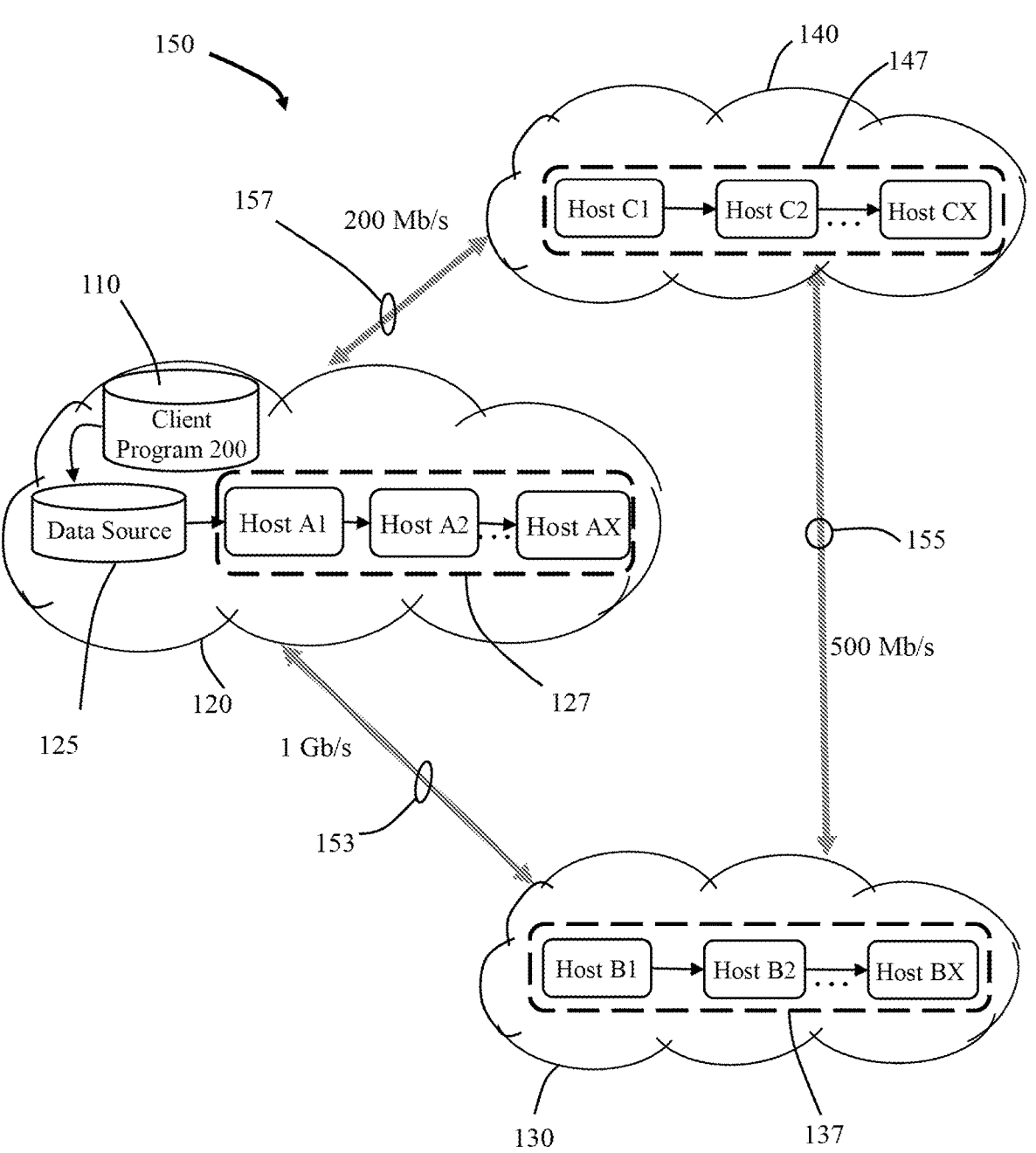
FIG. 1 is a functional block diagram illustrating a distributed data processing environment, in accordance with an embodiment of the present invention.

Embodiments of the present invention recognize that the use of pipeline transmission techniques as a solution to transmit data among multiple host devices within a particular cloud environment provides an effective and efficient solution. Embodiments of the present invention recognize that pipeline transmission involves linking host computing devices (i.e., servers, etc.) as an array in which data is sent from a client device, often saved to a data source, and transmitted to a first host of the array of hosts. As the data is received by the first host, the data is copied and transmitted to a second host of the array of hosts within the particular cloud environment. Transmission of the data continues to subsequent hosts of the array of hosts until all hosts of the array have received all the data transmitted. Often, the data transmission is at a byte or block level, such that a transmitted byte of data is received by a host device, copied, and re-transmitted to the subsequent host device and the transmission of data continues until the last host device in the array of host devices has received all the transmitted data. The last host device communicates the receipt of data and the completion of transmission to the client device that initiated the transmission, and the data received by each of the hosts of the array of host devices are ready for actions to be taken.

The "receive and re-transmit" actions by hosts devices in the array, especially at a byte level of data, minimize the time for all transmitted data to be received by all array host devices within the particular cloud environment, as opposed to the data source or client device transmitting the entire data stream to each of the host devices individually. Embodiments of the present invention recognize that the benefits of data transfer by pipeline transmission are limited to host devices within a single cloud environment in which the network bandwidth is usually constant between host devices. Embodiments recognize that current data processing and data management solution needs often involve multiple cloud environments, such as hybrid cloud solutions, which may have network bandwidths that are different between data transmission sources and between cloud environments.

Current practice options are to perform pipeline transmission between clouds in which the respective host device arrays act as host and transmit from a first cloud environment to a second cloud environment, and so forth, with the final host of the last cloud environment host device array transmitting a notification to the initiating client that data transmission is complete and subsequent operations can be performed on the data. The network connections between cloud environments will present a bottleneck for data transmission. The bottleneck creates situations in which some hosts have received all the data and must wait for other hosts in other cloud environments to complete receiving of all the data before the next operation can be performed on the data. One approach to avoid the bottleneck delay is to utilize hosts that operate within the same cloud environment with the same network bandwidth. The single cloud environment approach doesn't allow exploring and using different cloud environments to obtain the lowest operational cost for data processing workloads and avoids the other advantages and benefits of using multiple clouds for a hybrid cloud solution.

File server mode is widely used for data transmission inside and/or cross-cloud environments. The respective host server will get data from the file server directly. The drawback of this mode is that it is slower due to the sequential delivery of data transmission by the file server, which creates a bottleneck in data delivery.

For the known solutions, the pipeline transmission techniques present the fastest transmission in which an array connects the host devices between cloud environments, forming a large array and sequential transmission between host devices. The drawback of pipeline transmission is the requirement to build a large array of hosts from multiple cloud environments before data transmission initiates, which creates a complex solution and still involves the sequential transmission from host to host across multiple clouds, and thus deters use.

Embodiments of the present invention recognize that transmission of data to each cloud environment in sequence, followed by the use of the pipeline transmission techniques within the individual cloud environments consumes significant transmission time of the data source and/or client and delays the access and action to be taken on the data while transmission completes. Sequential transmission to individual cloud environments (also referred to, herein, as "cloud" or clouds") leaves network bandwidth between clouds unused and may create transmission bottlenecks.

Embodiments of the present invention recognize that data transmission improvement can be achieved by selectively and fully utilizing available bandwidth from data sources and between cloud environments. Embodiments recognize that certain data may be required across many or all hosts in multiple cloud environments of a provider, for example, initiating a large number of servers that require the same image, version updates of operating systems or applications across multiple cloud environments, or transaction data duplicated to geo-localize cloud environments. Embodiments provide a technological advantage to complete transmission of data to multiple host devices across multiple cloud environments in less time by utilizing multiple bandwidths among the cloud environments. Embodiments also enable action to be taken on the data sooner than enablement by current transmission techniques.

Embodiments of the present invention provide a computer-implemented method, computer program product, and computer system for enhancing pipeline transmission between multiple host arrays in separate cloud environments. The computer-implemented method builds an array of host devices within a respective cloud environment of a plurality of cloud environments. The host devices within a particular cloud environment that require the same transmitted data are often identified by the service provider of the respective cloud environments. The host devices of a respective cloud are included in an array in which an order of transmission of data is established as the array is built. The method builds the array of host devices within a respective cloud without specific rules and can be in a random order as the network bandwidth within a respective cloud does not present an issue of delay as compared to differences in network bandwidth between cloud environments.

The method determines a first set of network bandwidths between the respective clouds of the plurality of cloud environments. Embodiments of the present invention obtain the network bandwidth between respective cloud environments from an established contract with the cloud service provider. The contract between the client and/or data source and the provider of cloud environment services includes the network bandwidth among the plurality of cloud environments.

The method receives a first transmission of data from a client device operating with a data source to a first array of hosts within a first cloud of a plurality of cloud environments. The method directs the first transmission from the first cloud environment, which includes the client device and data source to a second cloud environment having a network connection with a bandwidth that is greater than the other cloud environments of the plurality of cloud environments.

The greater network bandwidth provides for a greater amount of data transmission (capacity) relative to network connections of lesser bandwidths to other clouds of the plurality of cloud environments. The selection of data transmission to the second array of host devices of the second cloud environment is based on the determined network bandwidth information of the first set of network bandwidths.

The method continues to transmit data to the first array of the first cloud environment while the data in the first cloud environment transmits the data from the first host device of the first array to the second host device, and so on using the pipeline transmission within the cloud environments to complete data transmission to all the host devices of the first array. In some embodiments, one or more host devices of the first array in the first cloud environment, having received at least some of the data transmission, transmits the received data to a second array of host devices in a second cloud environment, utilizing the bandwidth of the network connection between the first and second cloud environments.

In some embodiments, the second array of the second cloud environment receives data transmission from more than one source, based on information about received data for each host device of each array of host devices that is sent by each host to the client device. The host devices can obtain the information from the client device and request transmission of data from another array of host devices of another cloud environment that has already received the requested data. The exchange of received data information enables an array of host devices of a respective cloud to request data from another array of host devices, and the receiving array of host devices can control the data requested to avoid duplication. In this manner, an array of host devices may receive data transmission from multiple sources to fulfill the data transmission in less time by utilizing available network bandwidths from different sources. For example, an array of host devices of a second cloud environment may receive data from the array of host devices from the first cloud environment across a 200 MB/s network bandwidth while receiving a data transmission from a third array of host devices from a third cloud environment with a network bandwidth of 1 GB/s. The second host device array of the second cloud environment completes receipt of the data transmission much faster than relying on the 200 MB/s network connection bandwidth with the first cloud environment by utilizing additionally available bandwidths and requesting data as it becomes available from the other cloud environments.

The method includes notification to the client and/or data source by respective host devices of an array that all the data from the data transmission has been received. The notification enables actions to be taken on the completed data transmission for host devices of an array without the delay of waiting for all arrays of host devices to acknowledge the completion of the data transmission, which offers improvement for data operations. The last host device of each array of host devices receives information indicating it is the last host device of a respective array and initiates a notification to the client device or data source upon data transmission completion.

In some embodiments, the method includes building separate threads (processes) for a host to transmit data to separate host arrays in respective cloud environments, essentially allowing transmission of data to an array of host devices (also referred to herein as host device arrays), in one cloud environment without impacting transmission of data to another host device array in another cloud environment.

The present invention will now be described in detail with reference to the Figures. FIG. 1 is a functional block diagram illustrating a distributed data processing environment, generally designated 150, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

FIG. 1 depicts a wide area network (WAN) data processing environment 150. WAN data processing environment 150 includes a client device 110, cloud environment 120, data source 125, an array of host devices 127, cloud environment 130, host device array 137, cloud environment 140, host device array 147, network bandwidth 153, network bandwidth 155 and network bandwidth 157. WAN data processing environment 150 can be, for example, a geographically distributed network, such as the Internet, a virtual private network (VPN), or a combination of local and wide area networks that can include wired, wireless, or optical connections. In general, WAN data processing environment 150 can be any combination of connections and protocols that will support communication and data transmission between client device 110, data source 125, and cloud environments 120, 130, and 140.

Client device 110 operates within cloud environment 120 and includes transmission program 200 (depicted as "program 200"), which enhances the transmission of data to be received by multiple host devices located in multiple cloud environments by utilizing the available network bandwidth from a data source to the respective cloud environments as well as network bandwidth between cloud environments. Client device 110 is depicted as communicably connected to data source 125 and host devices (array of host devices) of cloud environment 120, as well as cloud environments 130 and 140, via network connections that include network bandwidth 153 and network bandwidth 157, respectively.

In some embodiments, client device 110 can be a laptop computer, desktop computer, mobile computing device, smartphone, tablet computer, or other programmable electronic device or computing system capable of receiving, sending, and processing data. In other embodiments, client device 110 may be a stand-alone computing device interacting with applications and services hosted and operating in a cloud computing environment. In still other embodiments, client device 110 may be a blade server, web-based server computer, or be included in a computing system utilizing clustered computers and components (e.g., database server computers, application server computers, etc.) that act, respectively, as a single pool of seamless resources when accessed within WAN data processing environment 150. In yet other embodiments, client device 110 can be a netbook computer, personal digital assistant (PDA), or other programmable electronic device capable of accessing a data source and transmitting data via a network connection to WAN data processing environment 150. Client device 110 may include internal and external hardware components, depicted in more detail in FIG. 3.

Transmission program 200 is depicted as program 200, operating on client device 110. In some embodiments, notice of a data transmission request to host devices in cloud environments 120, 130, and 140 initiates transmission program 200. Transmission program 200 builds an array of host devices operating within respective cloud environments of a plurality of cloud environments targeted to receive the data transmission. Transmission program 200 transmits data received by a first array of host devices in a first cloud environment to one or more arrays of host devices in one or more respective cloud environments. Transmission program 200 includes additional information generated within an array of host devices as the transmitted data is received and sends the information indicating received data to the client device 110, from which other arrays of host devices in other respective cloud environments may access and request data not yet received from arrays of host devices that have indicated receipt of the requested data. Transmission program 200 utilizes available network bandwidth to complete the data transmission across multiple cloud environments more quickly than current data transmission practices and allows an action to be taken on the data in arrays of host devices that have received all transmitted data without delay in waiting for all arrays of host devices to complete receipt of all data.

Cloud environment 120 is depicted as including client device 110, data source 125, and array of host devices 127, which includes a series of hosts devices depicted by host A1, host A2, . . . host Ax. Cloud environment 120 includes a network connection to cloud environment 130 by network connection 153 indicating a bandwidth of 1 gigabit per second (Gb/s). Cloud environment 120 includes a network connection to cloud environment 140 that includes network bandwidth 157 indicating a network bandwidth of 200 Mb/s.

Cloud environment 130 is depicted as including array of host devices 137, which includes a series of hosts devices depicted by host B1, host B2, . . . host BX. Cloud environment 130 includes a network connection to cloud environment 120 that includes network bandwidth 153 indicating a bandwidth of 1 gigabit per second (Gb/s), and a network connection to cloud environment 140 that includes network bandwidth 155 indicating a network bandwidth of 500 Mb/s.

Cloud environment 140 is depicted as including array of host devices 147, which includes a series of hosts devices depicted by host C1, host C2, . . . host CX. Cloud environment 140 includes a network connection to cloud environment 120 that includes network bandwidth 157 indicating a bandwidth of 200 Mb/s, and a network connection to cloud environment 130 that includes network bandwidth 155 indicating a network bandwidth of 500 Mb/s.

Array of host devices 127, includes a plurality of host devices configured as a sequential series of hosts operating within cloud environment 120. The series of host devices is represented in FIG. 1 as host A1 receiving a data transmission from client device 110/data source 125 and transmitting the data to host A2, which receives the transmitted data and transmits the data to the next host in the series that ends with the receipt of the transmitted data by host AX. Each host device of the array receives the transmitted data, saves a copy of the data, and transmits the data to the next host in the array sequence, following a pipeline transmission operation within cloud environment 120. In some embodiments of the present invention, array of host devices 127 receives, saves and transmits data at a byte level of transmission. In some embodiments, array of host devices 127 can transmit received data to multiple arrays of host devices operating in other respective cloud environments.

Array of host devices 137 includes a plurality of host devices configured as a sequential series of hosts operating within cloud environment 130. The series of host devices depicted in FIG. 1 includes host B1 transmitting to host B2, and so forth with host BX as the last host within array of host devices 137. Each host device of the array receives the transmitted data, saves a copy of the data, and transmits the data to the next host in the array sequence, following a pipeline transmission operation within cloud environment 130, with host BX sending a notification to client device 110 when the transmitted data receipt is completed. In some embodiments of the present invention, array of host devices 137 receives, saves and transmits data at a byte level of transmission. In some embodiments, array of host devices 137 can transmit received data to multiple arrays of host devices operating in other respective cloud environments.

Array of host devices 147 includes a plurality of host devices configured as a sequential series of hosts operating within cloud environment 140. The series of host devices depicted in FIG. 1 includes host C1 transmitting to host C2, and so forth with host CX as the last host within array of host devices 147. Each host device of the array receives the transmitted data, saves a copy of the data, and transmits the data to the next host in the array sequence, following a pipeline transmission operation within cloud environment 140, with host CX sending a notification to client device 110 when the transmitted data receipt is completed. In some embodiments of the present invention, array of host devices 147 receives, saves and transmits data at a byte level of transmission. In some embodiments, array of host devices 147 can transmit received data to multiple arrays of host devices operating in other respective cloud environments.

Figure 2:
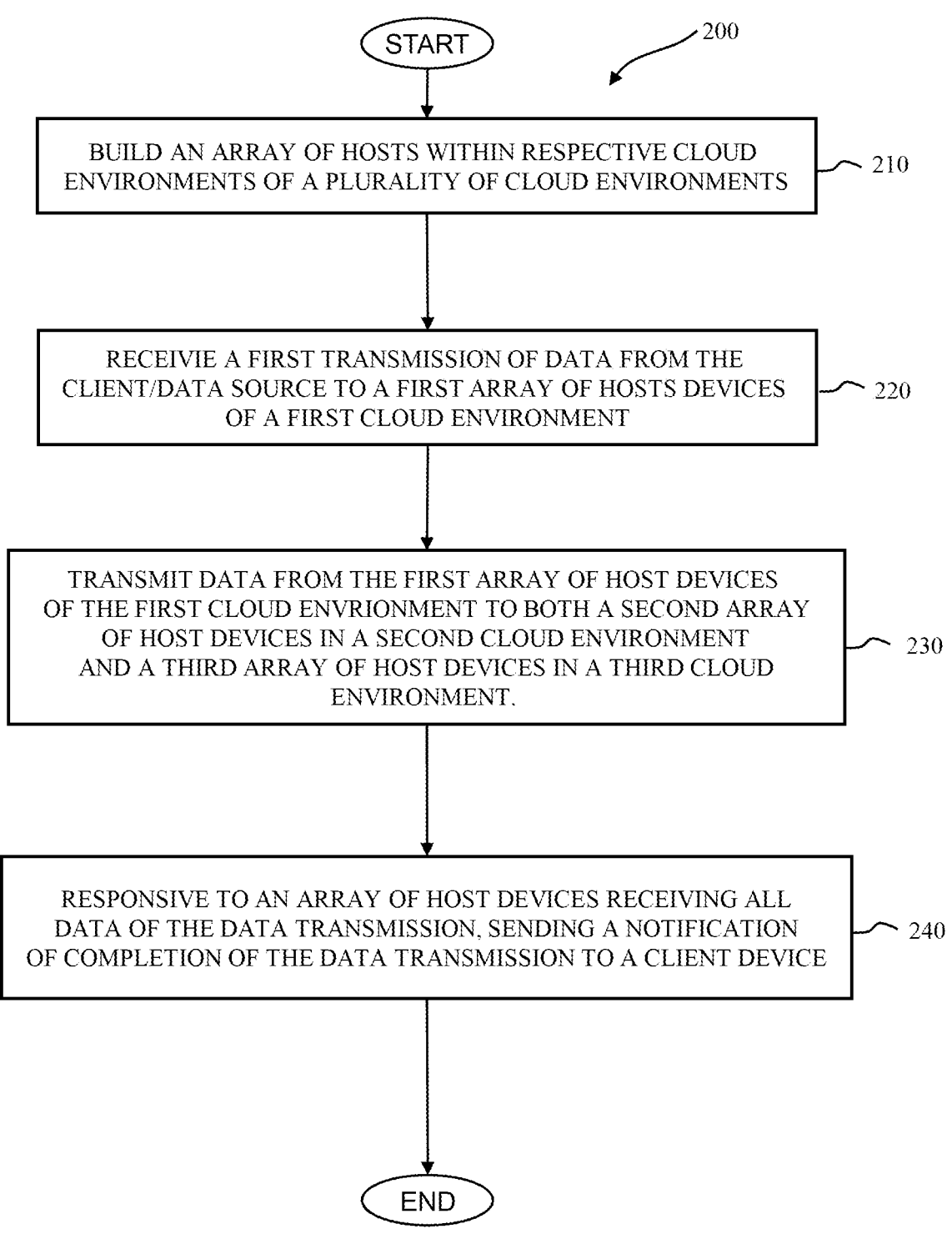
FIG. 2 is a flowchart depicting the operational steps of a transmission program, in accordance with embodiments of the present invention.

FIG. 2. is a flowchart depicting the operational steps of transmission program 200, in accordance with an embodiment of the present invention. Transmission program 200 enhances the transmission of data to multiple host devices located across a plurality of cloud environments in which the network connection bandwidth between cloud environments differs. Transmission program 200 utilizes available network connection bandwidth to facilitate the completion of data transmission to all targeted host devices across multiple cloud environments by transmitting data from multiple arrays of host devices and receiving data from multiple arrays of host devices of respective cloud environments.

Transmission program 200 builds arrays of host devices within respective cloud environments of a plurality of cloud environments (step 210). Transmission program 200 is initiated to transmit data to a plurality of host devices located across a plurality of cloud environments. Transmission program 200 builds an array of the host devices targeted to receive the data transmission within the respective cloud environments of the plurality of cloud environments. The array of host devices can be structured in a convenient order, and the array structure provides for sequential transmission and reception of the data transmission within a respective cloud environment. Embodiments of the present invention transmit data to a first host of the first array of host devices, which receives the data, saves a copy, and transmits the data to a subsequent host of the first array of host devices, and so on for each of the host devices in the array. Transmission program 200 builds an array of host devices in the respective cloud environments with host devices targeted to receive the data transmission.

For example, transmission program 200 builds an array of host devices in cloud environment 120 linking as a sequence of data transmission host A1, to host A2, to other hosts in cloud environment 120, to host AX as the end host in array of host devices 127. Transmission program 200 builds similar arrays of host devices in cloud environments 130 and 140 by creating a sequence of data transmission of host B1, to host B2, to other hosts in cloud environment 130, to host BX, forming array of host devices 137, and host C1, to host C2, to other hosts in cloud environment 140, to host CX forming array of host devices 147.

Transmission program 200 determines the network bandwidths (i.e., a measure of data transfer rate capacity) between the cloud environments targeted to receive the data transmission. For example, transmission program 200 determines the network connection bandwidth between cloud environment 120 and cloud environment 140 as 200 megabits per second (Mb/s) and the network bandwidth between cloud environment 120 and cloud environment 130 as 1 Gb/s, and the network connection bandwidth between cloud environment 130 and cloud environment 140 as 500 Mb/s. In some embodiments, the cloud service provider establishes the network bandwidths between cloud environments within a contract for providing cloud services. The network bandwidths are defined in the service contract with the cloud services provider.

Transmission program 200 directs the data transmission from the client/data source to a first array of host devices within a first cloud environment (step 220). Transmission program 200 propagates the data transmission through the first array of host devices within the first cloud environment, which is the same cloud environment in which the client/data source operates. Transmission program 200 transmits the data as a pipeline transmission within the first array of host devices of the first cloud environment. In embodiments of the present invention, the data transmission is received by a host device of the array of host devices, the data is saved to the host device, and subsequently transmitted to the next host device of the array of host devices. In some embodiments, the unit of data received, saved, and transmitted is at a byte level.

For example, transmission program 200 directs the data transmission to array of host devices 127 of cloud environment 120, which is the cloud environment that includes client device 110 and data source 125. Transmission program 200 transmits data to host A1 of array of host devices 127. Transmission program 200 includes instructions for host A1 to receive the data, save a copy of the data and transmit the data to host A2. In some embodiments, the data transmission is received, saved, and transmitted by each byte of data. In other embodiments, the data transmission is received, saved, and transmitted by other units of data, such as a block of data. Transmission program 200 instructs host A2 and each subsequent host to receive, save, and transmit the unit of the data to the subsequent host in array of host devices 127, until host AX receives and saves all the transmitted data.

Transmission program 200 transmits the data transmission from the first array of host devices within the first cloud environment to both a second array of host devices of a second cloud environment and a third array of host devices of a third cloud environment (step 230). In some embodiments transmission program 200 transmits the data to the second array of host devices and the third array of host devices at the same time, in which "the same time" refers to transmission program 200 instructing the host device to transmit the data to both the second array of host devices and the third array of host devices by building separate threads for the respective arrays of host devices, such that the transmission of data by one thread does not have an impact on the transmission of data by another thread. In some embodiments, using separate threads for processing the data from the first array of host devices in the first cloud environment, the transmission of data by transmission program 200 to two or more arrays of host devices in other respective cloud environments (i.e., the second cloud environment and the third cloud environment) occurs at the same time.

For example, transmission program 200 transmits the data received and saved by array of host devices 127 to both array of host devices 137 and array of host devices 147 of cloud environments 130 and 140, respectively. In some embodiments transmission program 200 initiates a separate thread for the transmission of data to the respective arrays of host devices, such that the data transmission is sent to both arrays at the same time.

In some embodiments, transmission program 200 transmits data from multiple arrays of host devices of respective cloud environments to utilize all available bandwidth to complete the data transmission across all arrays of host devices. By utilizing all available network connection bandwidth, transmission program 200 accelerates the completion of the data transfer over traditional transmission approaches. In some embodiments, transmission program 200 may select an order of data transmission from the first array of host devices of the first cloud environment to other arrays of host devices in respective other cloud environments to optimize the completion of data transmission to all cloud environments, based on network bandwidth information from the cloud services provider.

Embodiments of the present invention enable an array of host devices of one cloud environment to transmit data already received to multiple other arrays of host devices in multiple cloud environments. For example, as a byte of the data transmission is received and saved by the first array of host devices of the first cloud environment transmission program 200 transmits the byte of the data transmission to multiple other arrays of host devices of respective cloud environments. Additionally, embodiments of the present invention enable an array of host devices of a cloud environment to receive data transmissions from multiple arrays of host devices from other respective cloud environments.

Transmission program 200 includes extra information received from each array of host devices corresponding to received data, which enables an array of host devices to request data not yet received, from another array of host devices that has received the requested data. Arrays of host devices will report the extra information to the client device, such as client device 110 (FIG. 1), and other arrays of host devices among the plurality of cloud environments can obtain the information of data received from the client.

Responsive to an array of host devices receiving the complete data transmission, transmission program 200 sends a notification from the array of host devices to the client device subsequent to receiving the complete data transmission (step 240). The notification enables actions to be taken on the received data for the host devices within the array without having to wait for all hosts of all arrays of host devices to complete receipt of the data transmission, which is an improvement over current data transmission processing.

For example, transmission program 200 determines that array of host devices 127 has received the complete data transmission from client device 110/data source 125. Transmission program 200 sends a notification to client device 110 indicating completion of the receipt of the data transmission by the host devices of array of host devices 127. In some embodiments, the host devices that are transmitting data to other arrays of host devices in other cloud environments are identified in the notifications sent to client device 110. The data on host devices that have received all of the data transmission and are not transmitting data to other cloud environments are available for actions to be taken.

Subsequent to sending completion notifications of the data transmission by all the arrays of host devices of the respective cloud environments completion, transmission program 200 ends.

FIG. 3 depicts a schematic illustration of exemplary network resources associated with practicing the disclosed inventions. The inventions may be practiced by the disclosed processors performing an instruction stream. As shown in FIG. 3, computing environment 100 contains an example of an environment for the execution of at least some of the computer code involved in performing the inventive methods, such as the method of transmission program 200 in block 151, retained in persistent storage 113. In addition to block 151, computing environment 100 includes, for example, computer 101, wide area network (WAN) 102, end-user device (EUD) 103, remote server 104, public cloud 105, and private cloud 106. In this embodiment, computer 101 includes processor set 109 (including processing circuitry 119 and cache 121), communication fabric 111, volatile memory 112, persistent storage 113 (including an operating system 122 and transmission program 200 of block 151, as identified above), peripheral device set 114 (including user interface (UI), device set 123, storage 124, and network module 115. Remote server 104 includes remote database 132. Public cloud 105 includes gateway 145, cloud orchestration module 141, host physical machine set 142, virtual machine set 143, and container set 144.

COMPUTER 101 may take the form of a desktop computer, laptop computer, tablet computer, smartphone, smartwatch or other wearable computer, mainframe computer, quantum computer, or any other form of computer or mobile device now known or to be developed in the future that is capable of running a program, accessing a network or querying a database, such as remote database 132. In some embodiments, computer 101 may take the form of a handheld device capable of receiving audible input and transmitting a converted radio signal of the audible input to other similarly configured devices set to receive the transmitted signal on the same subchannel of a communication channel. As is well understood in the art of computer technology, and depending upon the technology, the performance of a computer-implemented method may be distributed among multiple computers and/or between multiple locations. On the other hand, in this presentation of computing environment 100, a detailed discussion is focused on a single computing device, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated. In some embodiments, client device 110 is similar to computer 101.

PROCESSOR SET 109 includes one, or more, computer processors of any type now known or to be developed in the future. Processing circuitry 119 may be distributed over multiple packages, for example, multiple, coordinated integrated circuit chips. Processing circuitry 119 may implement multiple processor threads and/or multiple processor cores. Cache 121 is a memory that is located in the processor chip package(s) and is typically used for data or code that should be available for rapid access by the threads or cores running on processor set 109. Cache memories are typically organized into multiple levels depending upon relative proximity to the processing circuitry. Alternatively, some, or all, of the cache for the processor set may be located "off-chip." In some computing environments, processor set 109 may be designed for working with qubits and performing quantum computing.

Computer readable program instructions are typically loaded onto computer 101 to cause a series of operational steps to be performed by processor set 109 of computer 101 and thereby affect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 109 to control and direct the performance of the inventive methods. In computing environment 100, at least some of the instructions for performing the inventive methods may be stored in transmission program 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that are now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code in the representative block 151 includes transmission program 200, which typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smartwatches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. In some embodiments of the present invention, EUD 103 may be client device 110, configured to initiate data transmission from data source 125. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 132 of remote server 104. Remote database 132 may represent one or more databases that includes data source 125 (FIG. 1).

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after the instantiation of the VCE. Cloud orchestration module 141 manages the transfer and storage of images, deploys new instantiations of VCEs, and manages active instantiations of VCE deployments. Gateway 145 is the collection of computer software, hardware, and firmware that allows public cloud 105 to communicate through WAN 102.

Some further explanations of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The programs described herein are identified based on the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for enhancing data transmission to multiple host devices in separate cloud environments, the method comprising:
   building an array of host devices within respective cloud environments of a plurality of cloud environments;
   determining a first set of network bandwidths between the respective cloud environments of the plurality of cloud environments;
   transmitting data to a first array of host devices of a first cloud environment in which a client device initiates data transmission using pipeline transmission where each host receives the data, saves a copy of the data, and transmits the data to a subsequent host until each host in the first array of host devices receives and saves a copy of the data;
   transmitting the data from the first array of host devices of the first cloud environment to a second array of host devices in a second cloud environment for pipeline transmission of the data between hosts in the second array of host devices; and
   transmitting the data from both the first array of host devices of the first cloud environment and the second array of host devices of the second cloud environment to a third array of host devices in a third cloud environment for pipeline transmission of the data between hosts in the third array of host devices, in response to the first array of host devices and the second array of host devices having received the data being transmitted to the third array of host devices.

2. The method of claim 1, wherein subsequent to receiving a complete data transmission, an array of host devices of a respective cloud environment of the plurality of cloud environments sends a notification to the client device acknowledging a completion of data transfer.

3. The method of claim 2, wherein the notification of the completion of the data transmission by the array of host devices of the respective cloud environment of the plurality of cloud environments enables action to be taken on data included in host devices of the array of host devices of the respective cloud environment without waiting for the data transmission to be completed on other arrays of host devices of other cloud environments of the plurality of cloud environments.

4. The method of claim 1, wherein information regarding data transmission received by respective arrays of host devices of respective cloud environments is sent to the client device, enabling the third array of host devices of the third cloud environment to access the information and request data from one or both of the first array of host devices of the first cloud environment and the second array of host devices of the second cloud environment that have already received the data requested by the third array of host devices.

5. The method of claim 1, wherein information regarding data transmission received by respective arrays of host devices is used by a requesting array of host devices to prevent duplication of transmitted data.

6. The method of claim 1, wherein the first array of host devices transmits data to the second array of host devices and the third array of host devices at a same time by applying separate threads for the data transmission to the second array of host devices of the second cloud environment and the third array of host devices of the third cloud environment.

7. The method of claim 1, further comprising:

generating information available to the first array of host devices, the second array of host devices, and the third array of host devices that indicates data received by respective arrays of host devices; and receiving a request from the third array of hosts of the third cloud environment to transmit data from the first array of host devices of the first cloud environment that has already received the data requested by the third array of host devices.

8. A computer system for enhancing data transmission to multiple host devices in separate cloud environments, the computer system comprising:

one or more computer processors; and one or more computer-readable storage media, and program instructions stored on the one or more computer-readable storage media, the program instructions comprising:

program instructions to build an array of host devices within respective cloud environments of a plurality of cloud environments;

program instructions to determine a first set of network bandwidths between the respective cloud environments of the plurality of cloud environments;

program instructions to transmit data to a first array of host devices of a first cloud environment in which a client device initiates data transmission using pipeline transmission where each host receives the data, saves a copy of the data, and transmits the data to a subsequent host until each host in the first array of host devices receives and saves a copy of the data;

program instructions to transmit data from the first array of host devices of the first cloud environment to a second array of host devices in a second cloud environment for pipeline transmission of the data between hosts in the second array of host devices; and program instructions to transmit data from both the first array of host devices of the first cloud environment and the second array of host devices of the second cloud environment to a third array of host devices in a third cloud environment for pipeline transmission of the data between hosts in the third array of host devices, in response to the first array of host devices and the second array of host devices having received the data being transmitted to the third array of host devices.

9. The computer system of claim 8, wherein the program instructions further comprise:

responsive to receiving a completion of data transmission, program instructions for an array of host devices of a respective cloud environment of the plurality of cloud environments to send a notification to the client device acknowledging the completion of the data transmission, wherein the program instructions to send the notification of the completion of the data transmission from the array of host devices of the respective cloud environment of the plurality of cloud environments enables action to be taken on the data included in host devices of the array of host devices without waiting for the data transmission to be completed on other arrays of host devices of other cloud environments of the plurality of cloud environments.

10. The computer system of claim 8, wherein program instructions send information regarding data transmission received by respective arrays of host devices of respective cloud environments to the client device, enabling the third array of host devices of the third cloud environment to access the information and request data from one or both of the first array of host devices of the first cloud environment and the second array of host devices of the second cloud environment that have received the data requested by the third array of host devices.

11. The computer system of claim 8, wherein program instructions to share information regarding data transmission received by respective arrays of host devices prevents duplication of transmitted data.

12. The computer system of claim 8, wherein program instructions transmit the data received by the first array of host devices, the second array of host devices, and the third array of host devices, within the respective array of host devices, by pipeline transmission.

13. The computer system of claim 8, wherein program instructions transmit data from the first array of host devices to the second array of host devices and the third array of host devices at a same time by generating separate threads for both the data transmission to the second array of host devices of the second cloud environment and the third array of host devices of the third cloud environment.

14. The computer system of claim 8, wherein the program instructions further comprise:

program instructions to generate information available to the first array of host devices, the second array of host devices, and the third array of host devices that indicates data received by respective arrays of host devices; and program instructions to receive a request from the third array of hosts of the third cloud environment to transmit data from the first array of host devices of the first cloud environment that has already received the data requested by the third array of host devices.

15. A computer program product for enhancing data transmission to multiple host devices in separate cloud environments, the computer program product comprising:

one or more computer-readable storage media, and program instructions stored on the one or more computer-readable storage media, the program instructions comprising:

program instructions to build an array of host devices within respective cloud environments of a plurality of cloud environments;

program instructions to determine a first set of network bandwidths between the respective cloud environments of the plurality of cloud environments;

program instructions to transmit data to a first array of host devices of a first cloud environment in which a client device initiates data transmission using pipeline transmission where each host receives the data, saves a copy of the data, and transmits the data to a subsequent host until each host in the first array of host devices receives and saves a copy of the data; program instructions to transmit data from the first array of host devices of the first cloud environment to a second array of host devices in a second cloud environment for pipeline transmission of the data between hosts in the second array of host devices; and program instructions to transmit data from both the first array of host devices of the first cloud environment and the second array of host devices of the second cloud environment to a third array of host devices in a third cloud environment for pipeline transmission of the data between hosts in the third array of host devices, in response to the first array of host devices and the second array of host devices having received the data being transmitted to the third array of host devices.

16. The computer program product of claim 15, wherein program instructions send information regarding data transmission received by respective arrays of host devices of respective cloud environments to the client device, enabling the third array of host devices of the third cloud environment to access the information and request data from one or both of the first array of host devices of the first cloud environment and the second array of host devices of the second cloud environment that have already received the data requested by the third array of host devices.

17. The computer program product of claim 15, wherein program instructions to share information regarding data transmission received by respective arrays of host devices prevents duplication of transmitted data.

18. The computer program product of claim 15, wherein program instructions transmit data from the first array of host devices to the second array of host devices and the third array of host devices at a same time by generating separate threads for both the data transmission to the second array of host devices of the second cloud environment and the third array of host devices of the third cloud environment.

19. The computer program product of claim 15, wherein the program instructions further comprise:

program instructions to generate information available to the first array of host devices, the second array of host devices, and the third array of host devices that indicates data received by respective arrays of host devices; and program instructions to receive a request from the third array of hosts of the third cloud environment to transmit data from the first array of host devices of the first cloud environment that has already received the data requested by the third array of host devices.

* * * * *